No. 656,928. Patented Aug. 28, 1900.
M. A. BIVER & A. E. HÉNARD.
MIRROR SUSPENDING DEVICE.
(Application filed May 22, 1900.)

(No Model.) 6 Sheets—Sheet 1.

WITNESSES

INVENTORS
Mathias Alfred Biver
Alfred Eugène Hénard
BY
Howson and Howson
ATTORNEYS No. 656,928. Patented Aug. 28, 1900.
M. A. BIVER & A. E. HÉNARD.
MIRROR SUSPENDING DEVICE.
(Application filed May 22, 1900.)
(No Model.) 6 Sheets—Sheet 4.
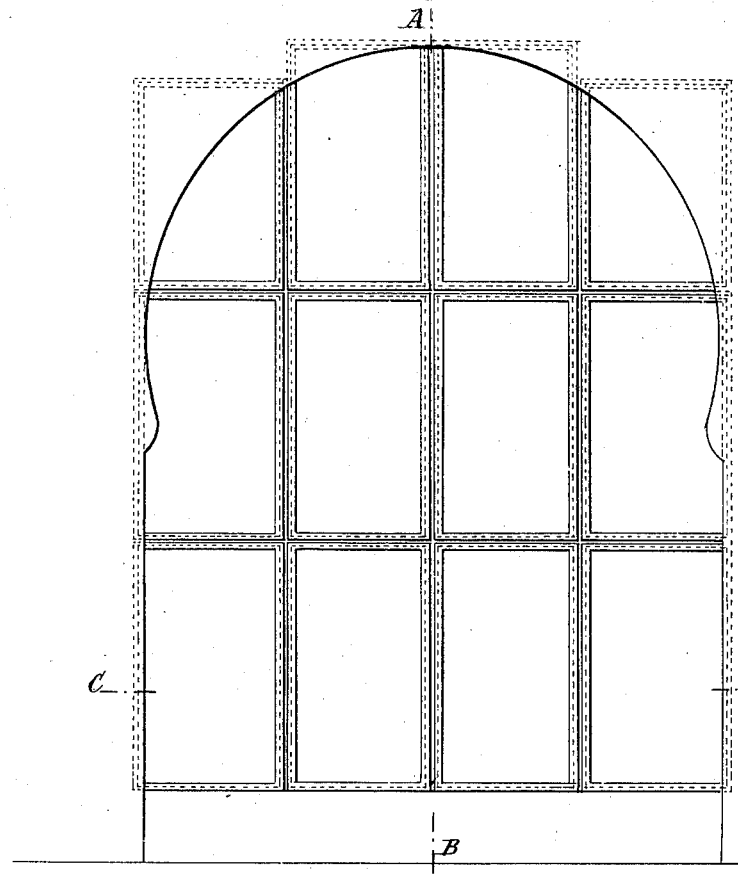
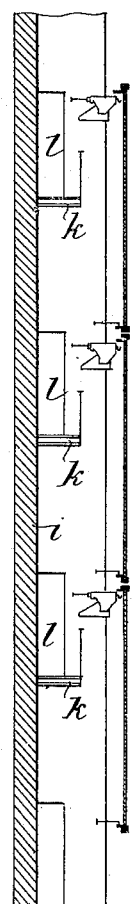
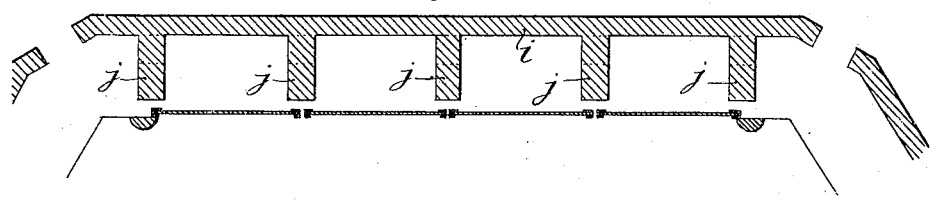
WITNESSES
INVENTORS
Mathias Alfred Biver
Alfred Eugène Hénard
BY
ATTORNEYS

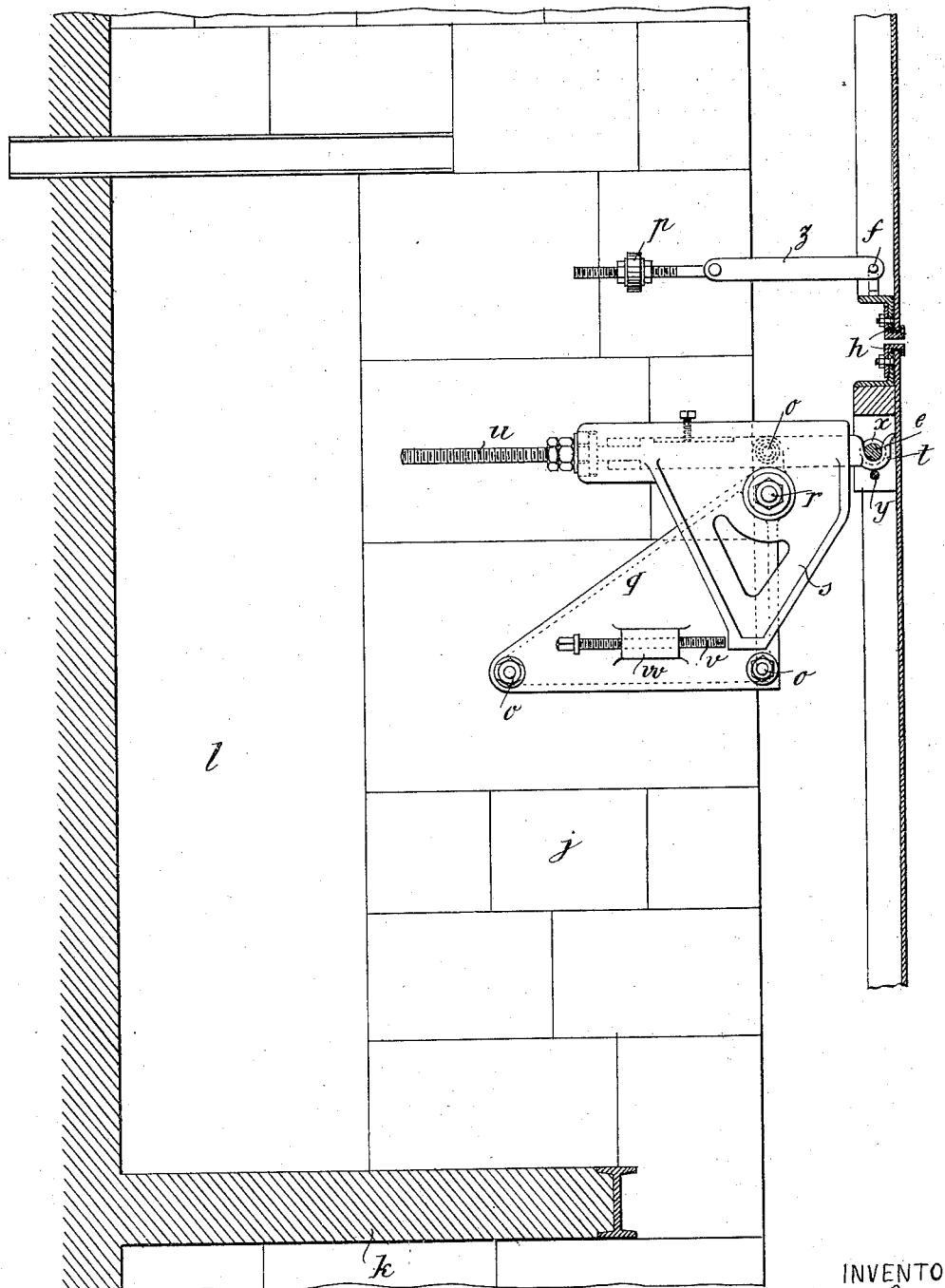

UNITED STATES PATENT OFFICE.

MATHIAS ALFRED BIVER AND ALFRED EUGÈNE HÉNARD, OF PARIS, FRANCE.

MIRROR-SUSPENDING DEVICE.

SPECIFICATION forming part of Letters Patent No. 656,928, dated August 28, 1900.

Application filed May 22, 1900. Serial No. 17,614. (No model.)

*To all whom it may concern:*

Be it known that we, MATHIAS ALFRED BIVER, engineer, residing at 9 Rue Sainte Cecile, and ALFRED EUGÈNE HÉNARD, architect, residing at 58 Rue Saint Lazare, Paris, France, have invented new Arrangements for Suspending and Adjusting the Mirrors Forming the Walls of Multiple Reflecting-Chambers, of which the following is a specification.

The present invention consists in new arrangements for suspending and adjusting the mirrors forming the walls of a multiple reflecting-chamber when the size of these walls does not permit of making them of one sheet of glass and also in obtaining certain special effects by means of walls thus constructed.

These chambers may be constructed with any number of walls; but we will describe, by way of illustration, our invention in connection with chambers formed with walls making with one another angles of ninety degrees, sixty degrees, or one hundred and twenty degrees. These are the only ones which permit of the illusion of a space repeated indefinitely in every direction with the same interior decoration. We will take, for example, the arrangements adopted in a hexagonal chamber, in which each of the walls being too large to be covered by a single mirror will be covered by, say, a dozen mirrors in juxtaposition.

Figure 1:
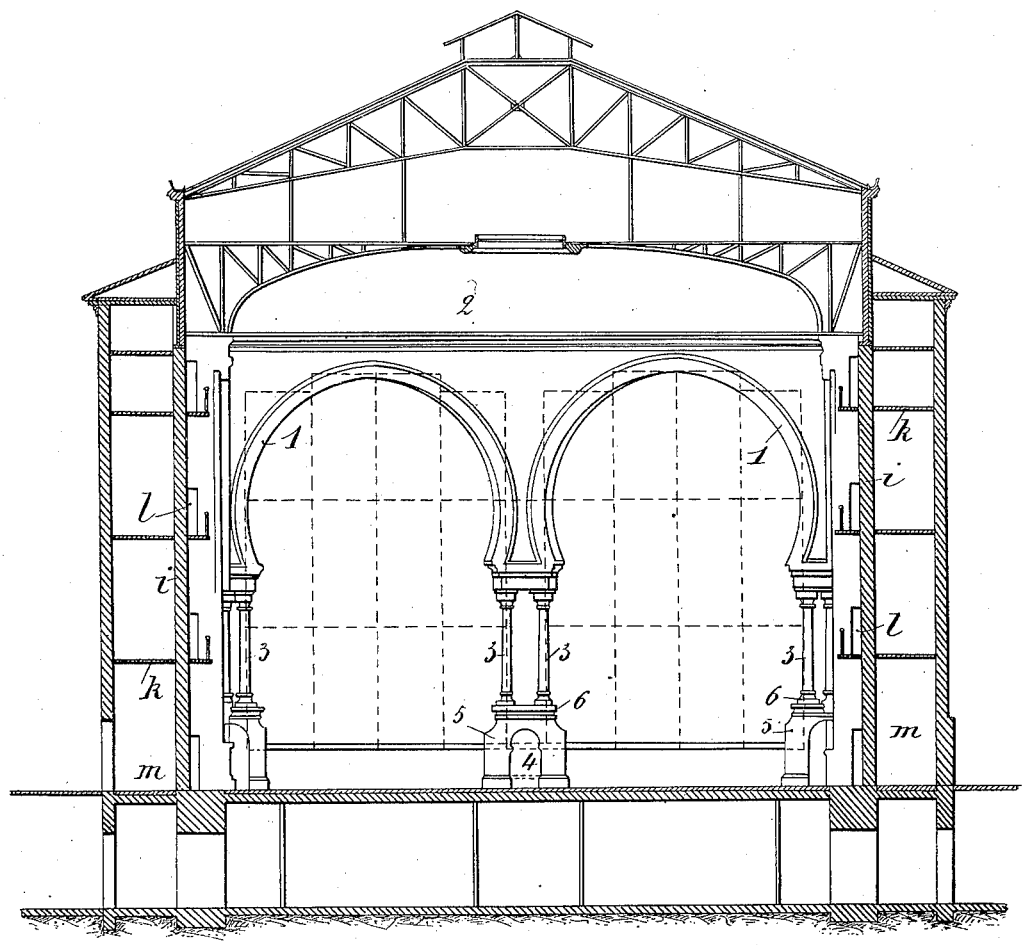
Figure 2:
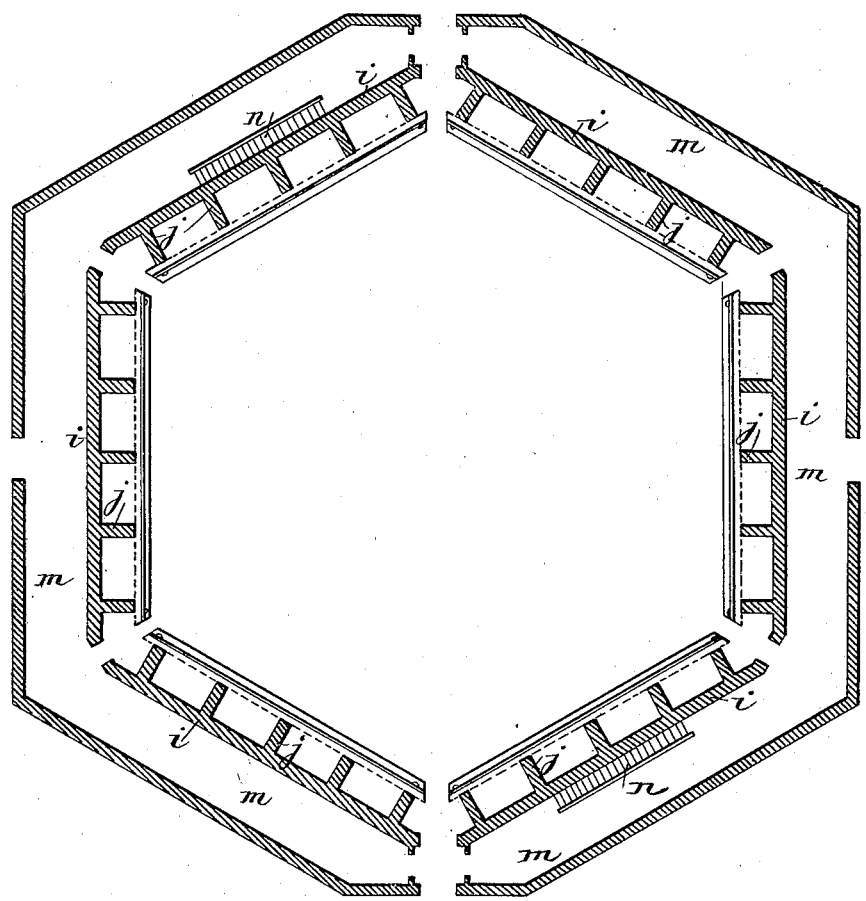
Figure 3:
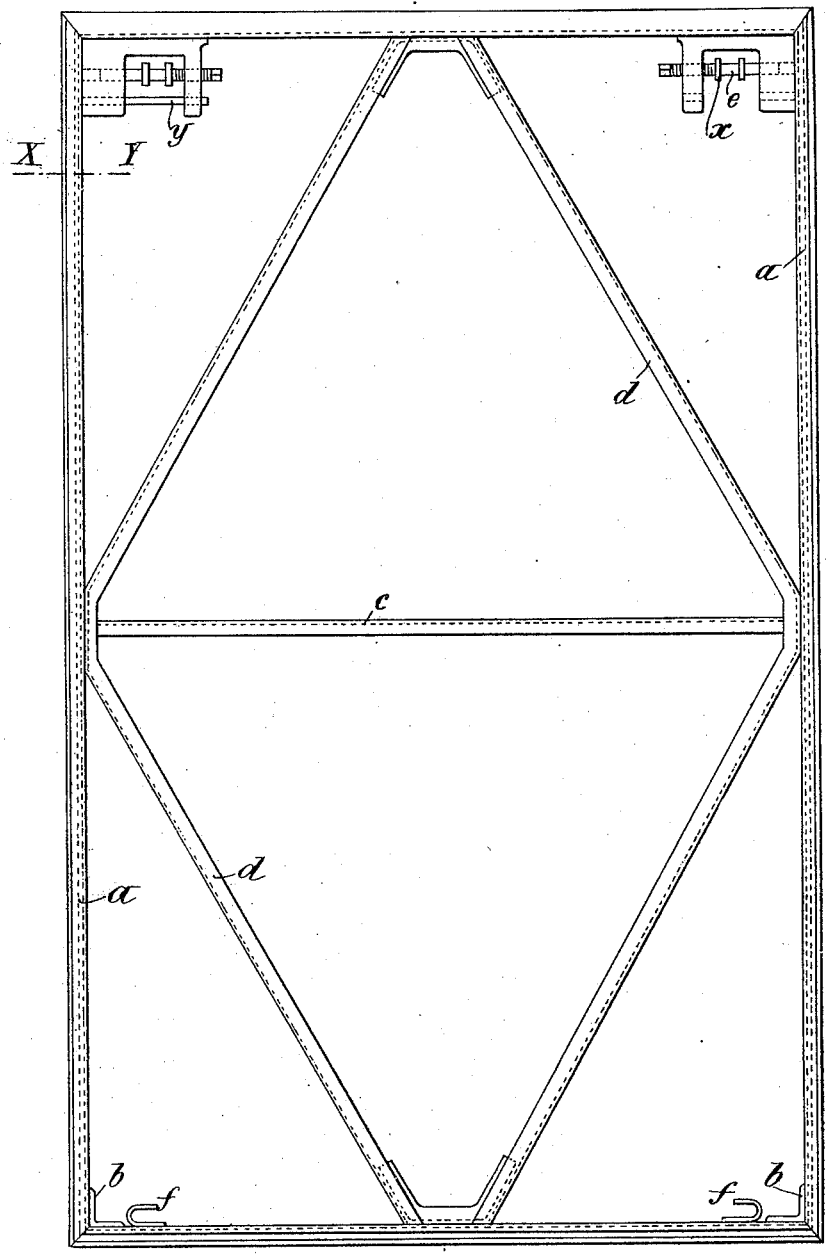
Figure 4:
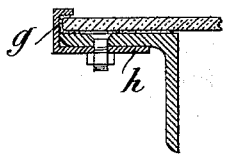
Figure 8:
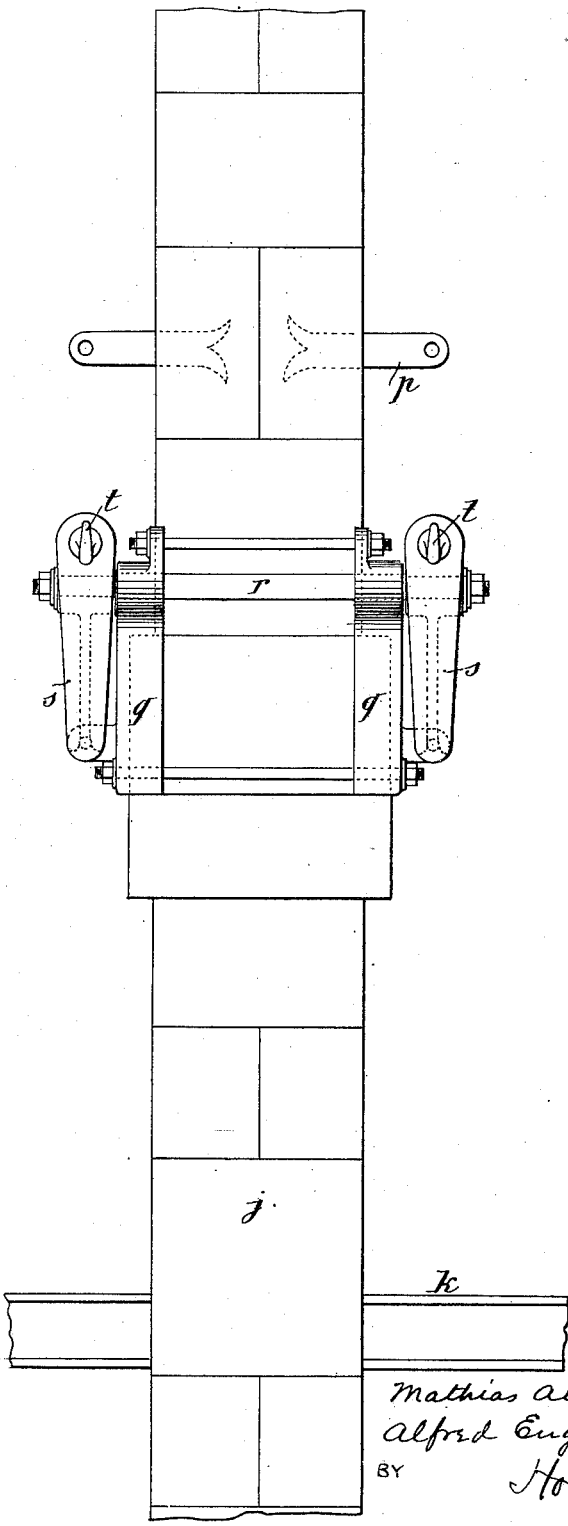

In the accompanying drawings, Figure 1 is a vertical section showing the general arrangement of the chamber. Fig. 2 is a corresponding horizontal section. Fig. 3 is a back view of a frame for receiving the mirror. Fig. 4 is a transverse section, on an enlarged scale, following the line of X Y of Fig. 3, showing in detail the mode of fitting the mirror to the frame. Fig. 5 is a front view of a mirror-faced wall. Fig. 6 is a vertical section following the line A B in Fig. 5. Fig. 7 is a horizontal section following the line C D in Fig. 5. Fig. 8 is a front view, on an enlarged scale, showing the disposition of the suspending and adjusting apparatus for the mirror-frames. Fig. 9 is a corresponding side view.

The chamber represented in Fig. 1 is, by supposition, decorated by six arcades 1, supporting an elliptically-vaulted roof 2, which roof is visible by reflection in the arcades provided with mirrors for at least two repetitions. Each arcade rests apparently upon the two half-columns 3, placed directly against the reflecting-walls; but it is in reality supported by a metal skeleton framework, distant about one foot from the reflecting-wall, in such manner as to permit of the raising and adjusting of the panels, Fig. 1. These half-columns 3, made of bars of transparent material, can be illuminated by means of electric lamps. The entrance to the chamber is effected by doors 4, placed in the bases of the columns at the angles of the chamber.

The construction of the mirror-frames to be suspended from the walls is given in detail in Figs. 3 and 4. The frame, which is rectangular, is constructed of bars $a$, of angle-iron, strengthened at its angles by brackets $b$, a bar $c$ across the middle, and four bars $d$, placed in form of a lozenge, the bars $c$ and $d$ serving to prevent the whole from altering its form. The frame is supported at its upper corners by horizontal adjustable bolts $e$, carried by arms adjustable in brackets upon the main wall, and retained in position upon the arms by collars $x$. These bolts form the suspending-axis of the frame and for that purpose enter pairs of lugs bolted to the back of the frame. These bolts are threaded and tapped into the lugs to provide for the lateral adjustment of the frame. The lower corners of the frame carry two hooks $f f$, which allow of the vertical adjustment of the frame by means of movable rods, as will be explained later. The frame-bars are made perfectly true and are arranged so as to make by the putting together of their surfaces a reflecting-surface as flat as possible. The mirror is held vertically upon the frame by an incasing of iron bent or drawn to a special shape $h$, Fig. 4, and making a bordering all around the edge of the mirror. This bordering serves to hold the mirror to the frame, but does not overlap the mirror edge by more than three-eighths of an inch. The mirror itself is bedded upon a plastic substance or felt and its edges are covered with the same material. In reality the mirror bears only on the lower bordering. It is merely held by the lateral ones and can expand freely by sliding in the borders without leaving its true plane. The visible position of the bordering and the edges of the mirror are painted a dull black, so as to make them as invisible as possible. Each panel thus constructed is hung to two adjusting apparatus, which are themselves bolted to and embedded in the wall of the chamber.

In order to avoid all vibration and expansion in the apparatus for suspending the mirrors and to give more rigidity to the wall which carries them, we make the latter a wall of masonry $i$, Figs. 5, 6, and 7, stayed by a series of vertical buttresses $j$, making projections from the wall of about four feet. These buttresses are connected one to another by a series of working platforms placed at such levels that one can from them easily effect the adjustment of the mirrors by hand. Small manholes $l$ in all the buttresses open to each platform and allow one to go the round of the chamber at all levels which correspond to the horizontal rows of mirrors. An outer passage $m$ and accessory stairs $n$, Fig. 2, allow one to mount easily to all parts of the chamber. The distance from center to center of each buttress $j$ is identical with the width of each panel. Each buttress can therefore carry one above the other upon its two sides the suspension apparatus for two adjoining panels, there being as many pairs of apparatus as there are superposed mirrors. The buttresses likewise carry lateral arms $p$, which serve to receive the regulating-rods from the lower portion of the mirrors provided to maintain the verticality. Each frame $a$ therefore is carried at its upper corners by the bolts $e$ upon two suspending and adjusting apparatus fixed upon adjoining buttresses upon the sides which face one another, and at the two lower corners the frame is held by means of the hooks $f$ by two adjusting apparatus fixed in like manner upon these buttresses.

The suspending and adjusting apparatus for each of the upper corners of the frame consists of a triangular cheek $q$, projecting beyond the vertical face of the buttress, the same being sunk and cemented into a block of hard stone and bolted to the cheek on the other side of the same buttress by bolts $o$, passing through or in front of the buttress $j$. By this means we secure an absolute rigidity in the system. The upper angle of each cheek is bored to receive a horizontal bolt $r$, likewise passing in front of the buttress. At each end of this bolt and perpendicular to its axis is pivoted a triangular suspension-bracket $s$, with its upper edge formed to receive a sliding arm $t$, with a strong hook at its forward end. At the hinder end of this arm is a threaded portion $a$, furnished with a nut which provides for the proper adjustment of the rod longitudinally. The lower angle of the bracket $s$ abuts on another adjusting-rod $v$, threaded and tapped into a lug $w$ on the cheek $q$, which allows of the stopping at any point the rocking movement of the bracket $s$. The hook of the suspending-arm $t$ catches onto the bolt $e$ at the upper corner of the frame between the two collars $x$, and by reason of the lateral movement of the bolts in the lugs on the frame the side movement of the panel is obtained. Finally a key-pin $y$, provided for below the hook on the bar $t$ and only put into the lug after placing the frame on the hook, prevents the frame from becoming unhooked, while leaving the latter free to take up a vertical position. The lower adjusting apparatus consists of a rod $z$, provided at one of its extremities with an eye, into which the hook $f$ on the frame can freely take, and connected at its other end to the buttress by means of a threaded rod tapped into the lateral arm $p$, cemented in the buttress $j$. The verticality of the frame can be regulated by means of nuts, the rod $z$ being enabled to move on the hook $f$, according to the lateral position of the latter. By means of this arrangement the frame may be made to take up three variable positions in directions perpendicular to one another, viz: first, vertically by means of the suspending-bracket and its rocking movement; second, horizontally in a direction perpendicular to the plane of the mirror by means of the sliding arm $t$ and its adjusting-screw, and, third, horizontally in a direction parallel to the plane of the glass by the movement of the suspension-bolt $e$ of the frame. One can thus regulate the plane of the reflecting-wall in the most perfect way possible, and one can modify within a sufficiently large range the position of each one of the panels composing a reflecting-wall of the chamber, so as to make all the reflecting-planes coincide and to place them side by side regularly and with the least possible amount of play, whether vertically or horizontally.

The arrangement described may vary in its details, the essential condition which forms the object of the present application being to adjust in three directions perpendicular to one another, the points of suspension of each mirror going to form the reflecting-wall.

We claim—

1. A polygonal chamber with reflecting-walls, each one composed of any number of mirrors, each in a special frame, in combination with means for suspending and attaching each frame independently of the others at its corners, and devices for adjusting each frame in three directions perpendicular to one another to change the verticality and plane of the reflecting-walls, all substantially as described.

2. A polygonal chamber having reflecting-walls consisting of a series of framed mirrors with suspending devices for each mirror, consisting of pairs of brackets movable about a horizontal axis parallel to the plane of the mirror, said brackets carrying sliding arms provided with hooks, and adjustable in a direction perpendicular to the mirror, and a supporting-bolt adjustable on the frame in a direction parallel to the plane of the mirror, in combination with a rod of adjustable length, provided to hold the mirror at its lower corners, substantially as described.

3. A polygonal chamber with reflecting-walls, composed of framed mirrors, each frame consisting of a rigid framework provided, at its edges, with a casing such as $h$, and carrying at its upper corners bolts $e$ threaded to be adjustable in a direction parallel to the plane of the mirror, and at its lower corners with hooks $f$, substantially as described.

In testimony whereof we have signed our names to this specification in the presence of two subscribing witnesses.

MATHIAS ALFRED BIVER.
ALFRED EUGÈNE HÉNARD.

Witnesses:
CHARLES DONY,
EDWARD P. MACLEAN.